US012116966B2

(12) United States Patent
Spizzirri et al.

(10) Patent No.: US 12,116,966 B2
(45) Date of Patent: Oct. 15, 2024

(54) FUEL PUMP FOR A DIRECT INJECTION SYSTEM

(71) Applicant: MARELLI EUROPE S.P.A., Corbetta (IT)

(72) Inventors: Armando Spizzirri, Corbetta (IT); Stefano Petrecchia, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 140 days.

(21) Appl. No.: 18/061,014

(22) Filed: Dec. 2, 2022

(65) Prior Publication Data

US 2023/0193866 A1 Jun. 22, 2023

(30) Foreign Application Priority Data

Dec. 21, 2021 (IT) ........................ 102021000031952

(51) Int. Cl.
*F02M 59/34* (2006.01)
*F02M 59/02* (2006.01)

(52) U.S. Cl.
CPC .......... *F02M 59/34* (2013.01); *F02M 59/025* (2013.01)

(58) Field of Classification Search
CPC ...... F02M 59/34; F02M 59/025; F02M 59/46; F02M 59/466; F04B 49/03; F04B 49/22; F04B 49/225; F04B 9/042; F04B 9/04; F04B 9/045
See application file for complete search history.

(56) References Cited

U.S. PATENT DOCUMENTS

| | | | | |
|---|---|---|---|---|
| 10,094,346 | B1 * | 10/2018 | De Vita | F02M 55/002 |
| 10,724,484 | B2 | 7/2020 | Pereira et al. | |
| 2009/0110575 | A1 | 4/2009 | Munakata et al. | |

(Continued)

FOREIGN PATENT DOCUMENTS

| | | | |
|---|---|---|---|
| DE | 102015212396 | A1 | 1/2017 |
| DE | 102018206696 | A1 | 11/2019 |

(Continued)

OTHER PUBLICATIONS

Search Report for Italian Patent Application No. 202100031952 dated Jul. 21, 2022.

*Primary Examiner* — Thomas Fink
(74) *Attorney, Agent, or Firm* — Howard & Howard Attorneys PLLC

(57) ABSTRACT

A fuel pump for a direct injection system and having: a main body; a pumping chamber; a piston, which is mounted in a sliding manner on the inside of the pumping chamber; an intake duct, which ends in the pumping chamber; an intake valve, which is arranged along the intake duct; and a flow rate adjustment device provided with a control rod which is coupled to the intake valve and with an electromagnetic actuator which is configured to axially move the control rod. The flow rate adjustment device has a containing element, which houses the electromagnetic actuator, has an open end facing the intake valve, and ends with a "U"-shaped rim which has an outer ring which is arranged around the containing element at a given distance from a cylindrical wall of the containing element. An annular weld (22) is obtained between the main body and the outer ring of the "U"-shaped rim.

9 Claims, 2 Drawing Sheets

(56) References Cited

U.S. PATENT DOCUMENTS

| | | | | |
|---|---|---|---|---|
| 2010/0242922 | A1* | 9/2010 | Mancini | F02M 59/367<br>417/295 |
| 2015/0083948 | A1* | 3/2015 | Bleeck | F02M 63/0015<br>251/129.19 |
| 2020/0256300 | A1* | 8/2020 | Perry | F04B 1/0452 |

FOREIGN PATENT DOCUMENTS

| | | | | | |
|---|---|---|---|---|---|
| EP | 2236809 | A2 | | 10/2010 | |
| EP | 2317119 | A1 | * | 5/2011 | F02M 55/04 |
| EP | 2317120 | A1 | * | 5/2011 | F02M 59/06 |
| EP | 2434137 | A1 | * | 3/2012 | F02M 59/20 |
| EP | 2508744 | A1 | * | 10/2012 | F02M 59/366 |
| EP | 3179092 | A1 | * | 6/2017 | F02M 59/06 |

* cited by examiner

FUEL PUMP FOR A DIRECT INJECTION SYSTEM

CROSS-REFERENCE TO RELATED APPLICATIONS

This patent application claims priority from Italian patent application no. 102021000031952 filed on Dec. 21, 2021, the entire disclosure of which is incorporated herein by reference

TECHNICAL FIELD

The present invention relates to a fuel pump for a direct injection system. Preferably, the direct injection system is used in an internal combustion engine with controlled ignition and thus fed with petrol or similar fuels.

PRIOR ART

A direct injection system comprises a plurality of injectors, a common rail which feeds the fuel under pressure to the injectors, a high-pressure fuel pump, which feeds the fuel to the common rail by means of a high-pressure feeding duct and is provided with a flow rate adjustment device, and a control unit which controls the flow rate adjustment device for maintaining the pressure of the fuel inside the common rail equal to an intended value generally variable over time depending on the operation conditions of the engine.

The high-pressure fuel pump described in patent application EP2236809A1 comprises: a main body, a pumping chamber made in the main body and inside which a piston slides with reciprocating motion, an intake duct adjusted by an intake valve for feeding the fuel at a low pressure inside the pumping chamber, and a delivery duct adjusted by a delivery valve for feeding the fuel at a high pressure outside of the pumping chamber and towards the common rail.

The intake valve is normally pressure operated and in the absence of external interventions the intake valve is closed when the pressure of the fuel in the pumping chamber is greater than the pressure of the fuel in the intake channel and is open when the pressure of the fuel in the pumping chamber is less than the pressure of the fuel in the intake channel. The flow rate adjustment device is mechanically coupled to the intake valve for maintaining, when necessary, the intake valve open during the pumping step of the piston and thus enabling a flow of fuel to come out of the pumping chamber through the intake channel. In particular, the flow rate adjustment device comprises a control rod, which is coupled to the intake valve and is movable between a passive position, in which it allows the intake valve to close, and an active position, in which it does not allow the intake valve to close. The flow rate adjustment device further comprises an electromagnetic actuator, which is coupled to the control rod for moving the control rod between the active position and the passive position. The electromagnetic actuator comprises a spring which maintains the control rod in the active position, and an electromagnet which is adapted to move the control rod in the passive position magnetically attracting a ferromagnetic keeper integral with the control rod against a fixed magnetic armature.

The flow rate adjustment device is normally housed in a metal bottom which is laser welded to a side wall of the main body in the area of the intake duct.

It has been noted that a small but not entirely negligible percentage of the high-pressure fuel pumps of the type described above are faulty particularly due to the absence of operation or for the irregular operation of the flow rate adjustment device.

Patent applications DE102015212396A1 and US2009110575A1 describe a high-pressure fuel pump for a direct injection system and comprising a flow rate adjustment device provided with a control rod which is coupled to the intake valve and with an electromagnetic actuator configured to axially move the control rod.

DESCRIPTION OF THE INVENTION

The object of the present invention is to provide a fuel pump for a direct injection system, said fuel pump having greater reliability (i.e. reduced faultiness) and, simultaneously, being easy and quick to produce.

According to the present invention, a fuel pump for a direct injection system is provided, according to what claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
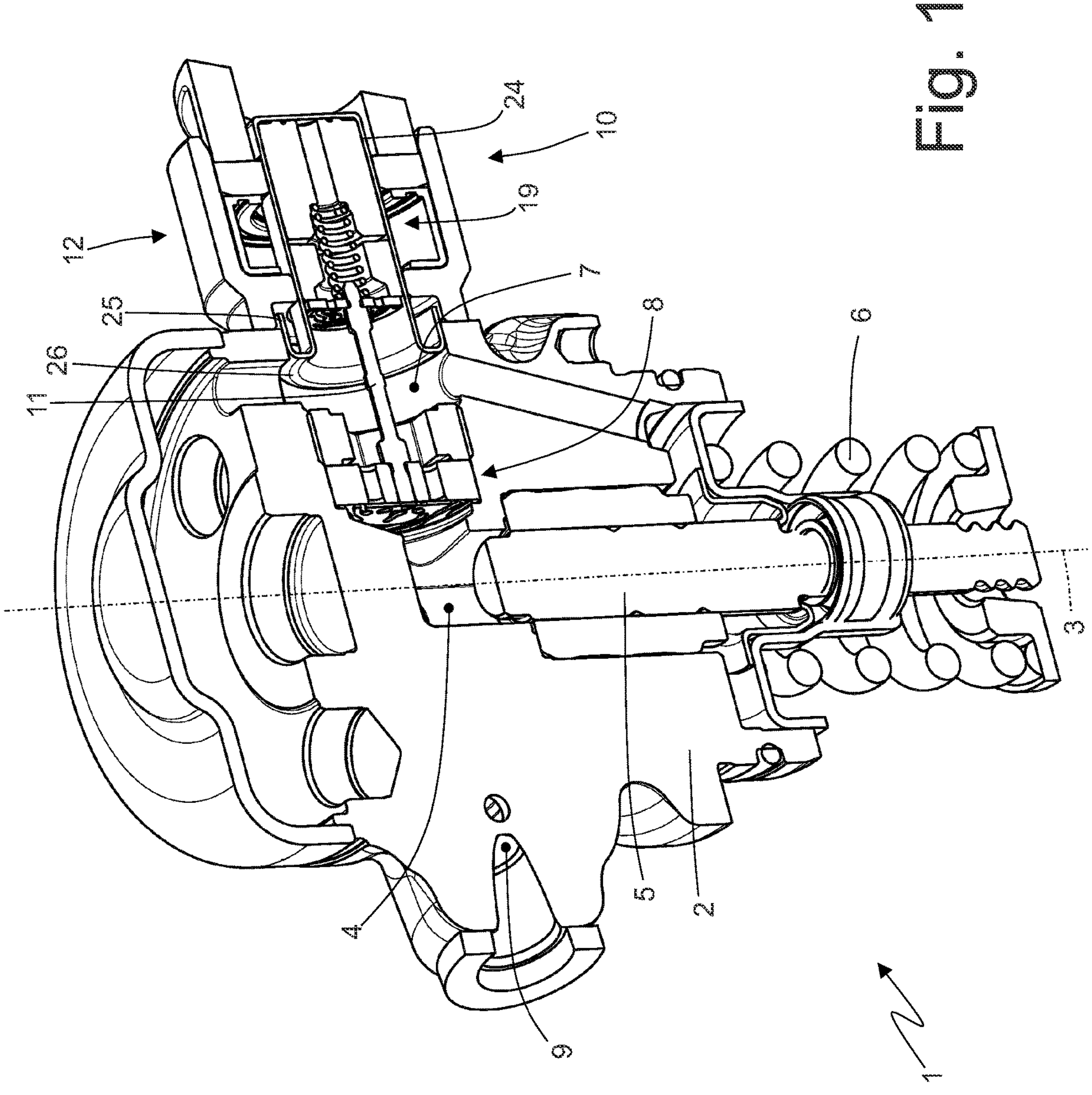
FIG. 1 is a perspective longitudinal section view of a fuel pump manufactured in accordance with the present invention.

In FIG. 1, reference numeral 1 indicates, as a whole, a high-pressure fuel pump for a direct fuel injection system of common rail type in an internal combustion engine; preferably, the direct injection system is used in an internal combustion engine having a controlled ignition and thus fed with petrol or similar fuels.

The high-pressure pump 1 comprises a main body 2 which has a longitudinal axis 3 and defines therein a pumping chamber 4 having a cylindrical shape. On the inside of the pumping chamber 4, a piston 5 is mounted in a sliding manner which, by moving with reciprocating motion along the longitudinal axis 3, causes a cyclical variation of the volume of the pumping chamber 4. A lower portion of the piston 5 is coupled on one side to a spring 6 which tends to push the piston 5 towards a position of maximum value of the pumping chamber 4 and is coupled on the other side to an eccentric (not illustrated) which is driven into rotation by a driving shaft of the internal combustion engine for cyclically moving the piston 5 upwards compressing the spring 6.

From a side wall of the pumping chamber 4 an intake duct 7 originates which is adjusted by an intake valve 8 arranged in the area of the pumping chamber 4. From a side wall of the pumping chamber 4 and from the opposite side with respect to the intake duct 7, a delivery duct 9 originates which is adjusted by a mono-directional delivery valve (not illustrated) which is arranged in the area of the pumping chamber 4 and only allows a flow of fuel to exit the pumping chamber 4.

The high-pressure pump 1 comprises a flow rate adjustment device 10 which is coupled to the intake valve 8 (i.e.

acts on the intake valve 8). The flow rate adjustment device 10 comprises a control rod 11, which is coupled to the intake valve 8 and is movable between a passive position, in which it allows the intake valve 8 to close, and an active position, in which it does not allow the intake valve 8 to close. The flow rate adjustment device 10 further comprises an electromagnetic actuator 12, which is coupled to the control rod 11 for moving the control rod 11 between the active position and the passive position.

Figure 2:
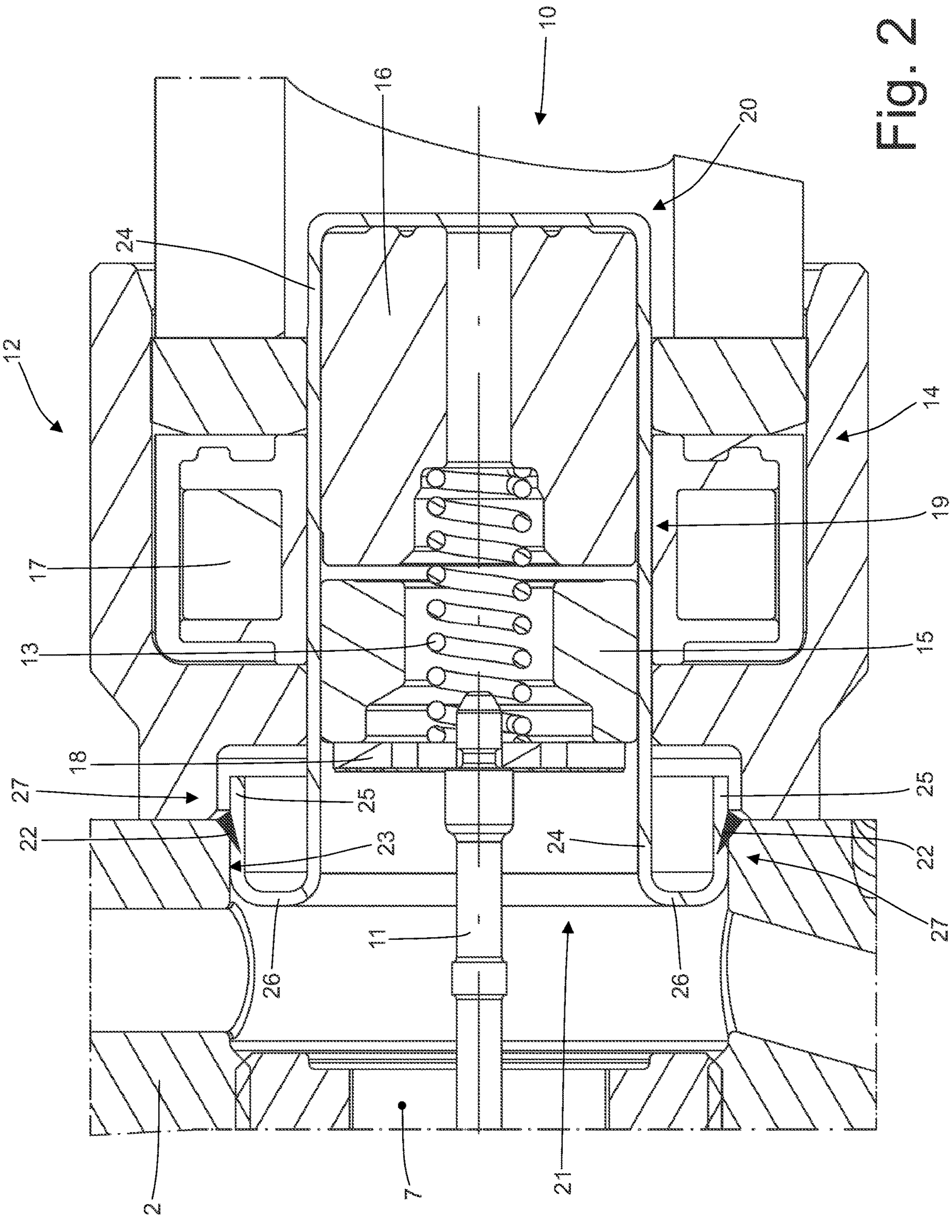
FIG. 2 is a view on an enlarged scale of a detail of the fuel pump of FIG. 1.

According to what is illustrated in FIG. 2, the electromagnetic actuator 12 comprises a spring 13 which maintains the control rod 11 in the active position, and an electromagnet which is adapted to move the control rod 11 in the passive position magnetically attracting a ferromagnetic keeper 15 integral with the control rod 11. When the electromagnet 14 is excited, the control rod 11 is called back into the passive position and the communication between the intake duct 7 and the pumping chamber 4 can be interrupted by the closing of the intake valve 8. The electromagnet 14 comprises a fixed magnetic armature 16 which is surrounded by a coil 17; when passed through by an electric current, the coil 17 generates a magnetic field which magnetically attracts the keeper 15 towards the magnetic armature 16. The control rod 11 and the keeper 15 together form a mobile equipment of the flow rate adjustment device 10 which axially moves between the active position and the passive position under the control of the electromagnetic actuator 12. The keeper 15 and the magnetic armature 16 have an annular shape centrally holed so as to have an empty central space in which the spring 13 is housed.

The electromagnetic actuator 12 comprises a one-way hydraulic brake 18 which is integral with the control rod 11 and slows down the movement of the mobile equipment (i.e. of the control rod 11 and of the keeper 15) only when the mobile equipment moves towards the active position (i.e. the hydraulic brake 18 does not slow down the movement of the mobile equipment when the mobile equipment moves towards the passive position).

The adjustment device 10 comprises a cup-shaped cylindrical metallic containing element 19 and thus having a closed end 20 and an open end 21 opposite the closed end 20. The containing element 19 is connected to the main body 2 through an annular weld 22 obtained through laser; the annular weld 22 has the function of both establishing a stable mechanical connection between the containing element 19 and the main body 2, and of creating a hydraulic seal around the containing element 19. In particular, the main body 2 has a cylindrical hole 23 which is in direct communication with the intake duct 7, is coaxial to the intake valve 8 and is sealingly engaged by the containing element 19.

According to what is illustrated in FIG. 2, the containing element 19 comprises a (inner) cylindrical wall 24 inside which the electromagnetic actuator 12 is arranged which is in direct contact with the (inner) cylindrical wall 24; i.e. the (inner) cylindrical wall 24 defines a housing of the containing element 19 in which the electromagnetic actuator 12 is inserted without appreciable clearance. Furthermore, the containing element 19 comprises a (outer) cylindrical wall 25 which is coaxial to the (inner) cylindrical wall 24, has a diameter greater than a diameter of the (inner) cylindrical wall 24, is arranged around the (inner) cylindrical wall 24 at a non-null distance from the (inner) cylindrical wall 24, and is connected to the (inner) cylindrical wall 24 by means of a discoidal wall 26 having an outer circular rim integral with the (outer) cylindrical wall 25 and an inner circular rim integral with the (inner) cylindrical wall 24. The assembly of the (inner) cylindrical wall 24, of the (outer) cylindrical wall 25 and of the discoidal wall 26 constitutes a "U"-shaped rim 27 of the containing element 19 which is arranged in the area of the open end 21. The annular weld 22 is obtained between the main body 2 and the (outer) cylindrical wall 25 of the containing element 19.

In other words, the containing element 19 ends with the "U"-shaped rim 27 which is arranged in the area of the open end 21 and has on the outside the cylindrical wall 25 (i.e. an outer ring) arranged around the cylindrical wall 24 and at a given distance from the cylindrical wall 24. The annular weld 22 is obtained between the main body 2 and the outer ring (i.e. the cylindrical wall 25) of the "U"-shaped rim 27 of the containing element 19.

In particular, an inner diameter of the cylindrical hole 23 of the main body 2 is (substantially) equal to an outer diameter of the cylindrical wall 25 (i.e of the outer ring of the "U"-shaped rim 27) of the containing element 19 so that the cylindrical wall 25 engages the cylindrical hole 23 substantially without appreciable clearance.

According to a preferred embodiment, the upper edges of the "U"-shaped rim 27 of the containing element 19 are rounded; in this manner the "U"-shaped rim 27 of the containing element 19 has a countersunk shape (thus self-centering) which eases the insertion of the "U"-shaped rim 27 of the containing element 19 inside the cylindrical hole 23 of the main body 2.

The embodiments described herein can be combined with one another without departing from the scope of protection of the present invention.

The fuel pump 1 described above has numerous advantages.

Firstly, the fuel pump 1 described above has a high reliability (i.e. a reduced faultiness). This result is obtained thanks to the fact that the annular weld 22 is not obtained directly between the main body 2 and a wall of the containing element 19, but is obtained between the main body 2 and the cylindrical wall 25 (i.e. the outer ring of the "U"-shaped rim 27), it is thus obtained at a given distance from the cylindrical wall 24 of the containing element 19; in this manner, the possible deposits which accidentally form during the making of the annular weld 22 do not enter the containing element 19 but remain on the outside of the containing element 19.

In other words, during the execution through laser of the annular weld 22, melted metal spatters can originate which, when cooling, form small deposits; but such small deposits do not manage to enter the containing element 19 since the annular weld 22 is not obtained directly between the main body 2 and the cylindrical wall 24 of the containing element 19, but is obtained between the main body 2 and the cylindrical wall 25 (i.e. the outer ring of the "U"-shaped rim 27), it is thus obtained at a given distance from the cylindrical wall 24 which constitutes the containing element 19.

The absence of possible deposits generated by a weld inside the containing element 19 allows reducing in a substantial manner the faultiness in particular of the flow rate adjustment device 10, since these small deposits, if present, could migrate, for example, towards the ferromagnetic keeper 15 blocking or anyway altering its sliding ability or reducing its stroke.

Furthermore, the thickness of the cylindrical wall 24 of the containing element 19 can be contained (i.e. the thickness of the cylindrical wall 24 of the containing element 19 can be particularly thin), all to the advantage of the reduction in the magnetic flows dispersed in the electromagnetic actuator 12 (thus ensuring a high energy efficiency of the electromagnetic actuator 12). In fact, the thickness of the cylindrical wall 24 of the containing element 19 can be contained since the wall of the containing element 19 does not necessarily have to resist the breaching which can occur during the laser welding for obtaining the annular weld 22, because also in case of breaching during the laser welding, the deposits generated by the breaching remain anyway distant from the electromagnetic actuator 12.

Finally, the fuel pump 1 described above is easy and quick to assemble since the annular weld 22 is simple to obtain being well accessible from the outside and since no additional piece is used (essentially, a small modelling of the rim 27 of the containing element 19 which has to be "U" shaped is sufficient).

LIST OF THE REFERENCE NUMERALS OF THE FIGURES

1 fuel pump
2 main body
3 longitudinal axis
4 pumping chamber
5 piston
6 spring
7 intake duct
8 intake valve
9 delivery duct
10 flow rate adjustment device
11 control rod
12 electromagnetic actuator
13 spring
14 electromagnet
15 keeper
16 armature
17 coil
18 hydraulic brake
19 containing element
20 closed end
21 open end
22 annular weld
23 cylindrical hole
24 cylindrical wall
25 cylindrical wall
26 discoidal wall
27 rim

The invention claimed is:

1. A fuel pump (1) for a direct injection system and comprising:

a main body (2);

a pumping chamber (4) defined in the main body (2);

a piston (5), which is mounted in a sliding manner on the inside of the pumping chamber (4) so as to cyclically vary the volume of the pumping chamber (4);

an intake duct (7), which ends in the pumping chamber (4);

an intake valve (8), which is arranged along the intake duct (7); and a flow rate adjustment device (10) provided with a control rod (11), which is coupled to the intake valve (8), and with an electromagnetic actuator (12), which is configured to axially move the control rod (11);

wherein the flow rate adjustment device (10) comprises a containing element (19), which houses the electromagnetic actuator (12), has an open end (21) facing the intake valve (8), and is connected to the main body (2) by means of an annular weld (22);

wherein the containing element (19) comprises a first cylindrical wall (24) inside which the electromagnetic actuator (12) is arranged, which is in direct contact with the first cylindrical wall (24);

wherein the containing element (19) comprises a second cylindrical wall (25), which is coaxial to the first cylindrical wall (24), has a diameter greater than a diameter of the first cylindrical wall (24), is arranged around the first cylindrical wall (24) at a non-null distance from the first cylindrical wall (24), and is connected to the first cylindrical wall (24) by means of a discoidal wall (26) having an outer circular rim integral with the second cylindrical wall (25) and an inner circular rim integral with the first cylindrical wall (24); and wherein the annular weld (22) is obtained between the main body (2) and the second cylindrical wall (25) of the containing element (19).

2. The fuel pump (1) according to claim 1, wherein the annular weld (22) creates a hydraulic seal around the containing element (19).

3. The fuel pump (1) according to claim 1, wherein the annular weld (22) is obtained through laser.

4. The fuel pump (1) according to claim 1, wherein the electromagnetic actuator (12) comprises:

a spring (13), which is arranged inside the containing element (19);

a ferromagnetic keeper (15), which is integral with the control rod (11) and is arranged inside the containing element (19);

a fixed magnetic armature (16), which is arranged inside the containing element (19); and a coil (17), which is arranged around the containing element (19).

5. The fuel pump (1) according to claim 4, wherein the electromagnetic actuator (12) comprises a one-way hydraulic brake (18), which is integral with the control rod (11) and is arranged inside the containing element (19).

6. The fuel pump (1) according to claim 1, wherein the main body (2) has a cylindrical hole (23), which is engaged by the containing element (19).

7. The fuel pump (1) according to claim 6, wherein an inner diameter of the cylindrical hole (23) is equal to an outer diameter of the second cylindrical wall (25) of the containing element (19), so that the second cylindrical wall (25) engages the cylindrical hole (23) substantially without clearance.

8. The fuel pump (1) according to claim 1, wherein the assembly of the first cylindrical wall (24), of the second cylindrical wall (25) and of the discoidal wall (26) constitutes a "U"-shaped rim (27) of the containing element (19) which is arranged in the area of the open end (21).

9. The fuel pump (1) according to claim 8, wherein the upper edges of the "U"-shaped rim (27) of the containing element (19) are rounded.

* * * * *